May 19, 1942.  H. A. BRASSERT ET AL  2,283,163
SHAFT FURNACE AND METHOD OF OPERATING SAME
Filed Feb. 7, 1941  3 Sheets-Sheet 2
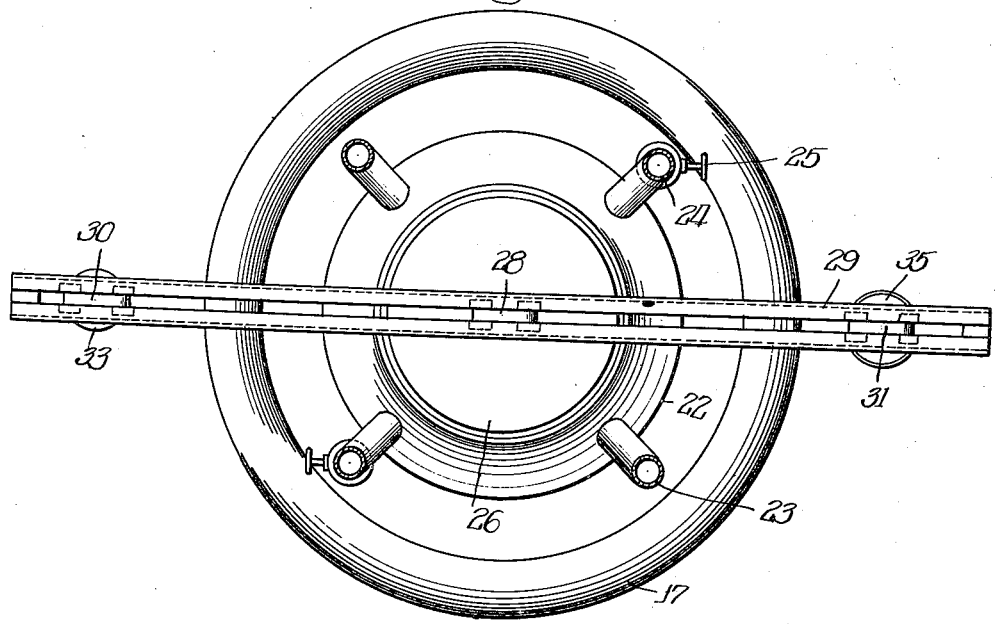
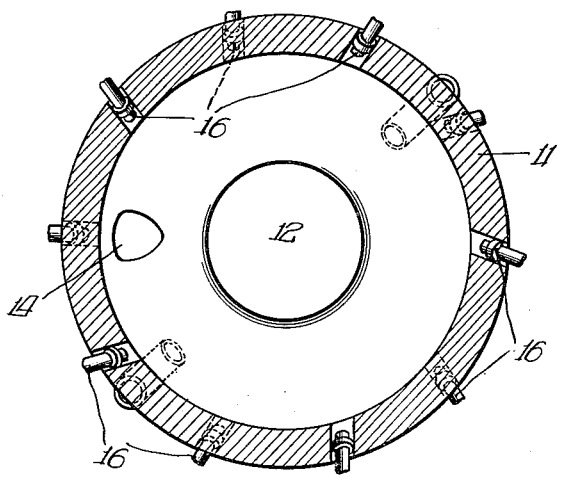
INVENTORS.
Herman A. Brassert,
Edward L. Ives,
BY
Wilkinson, Huxley, Byron & Knight
attys.

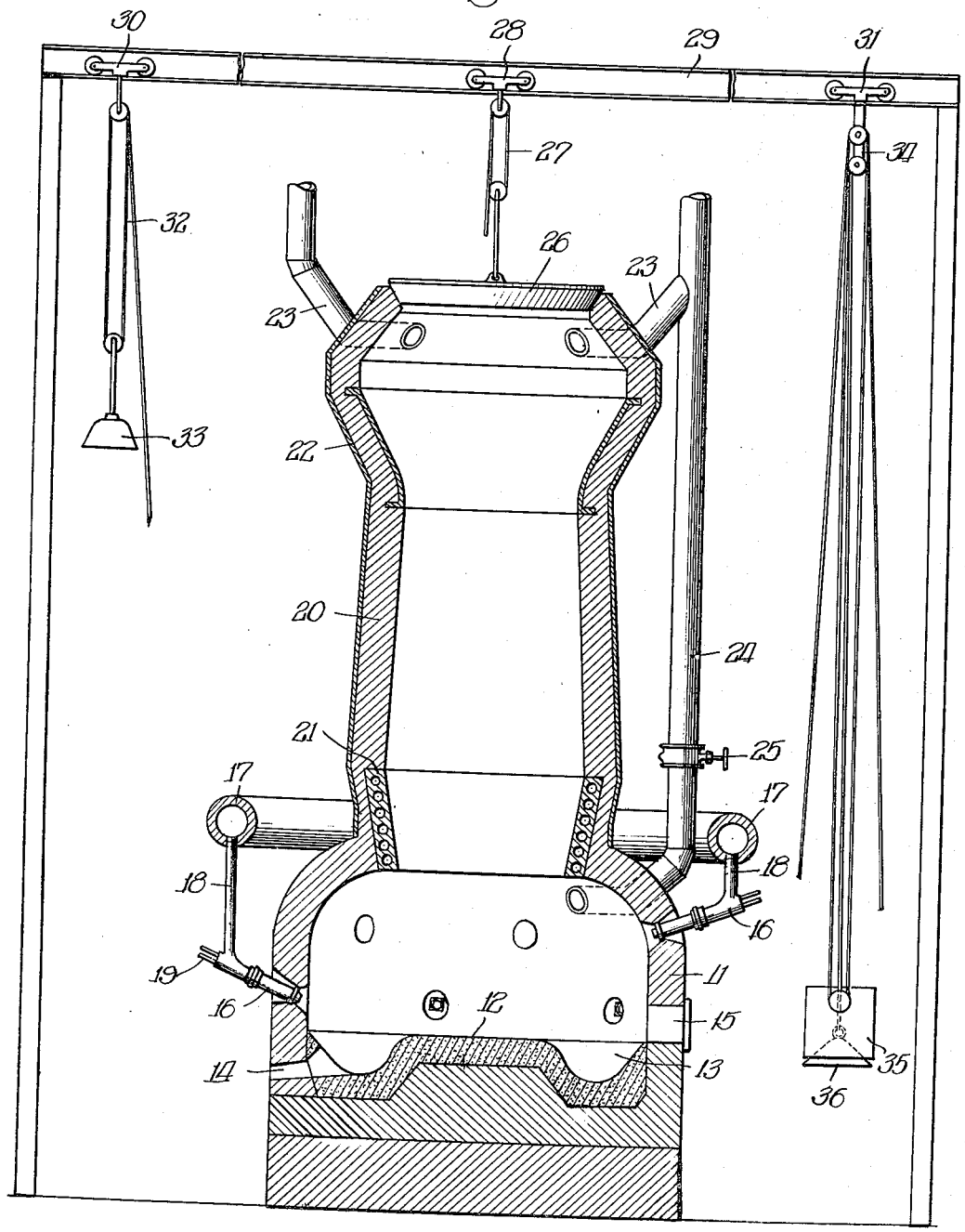

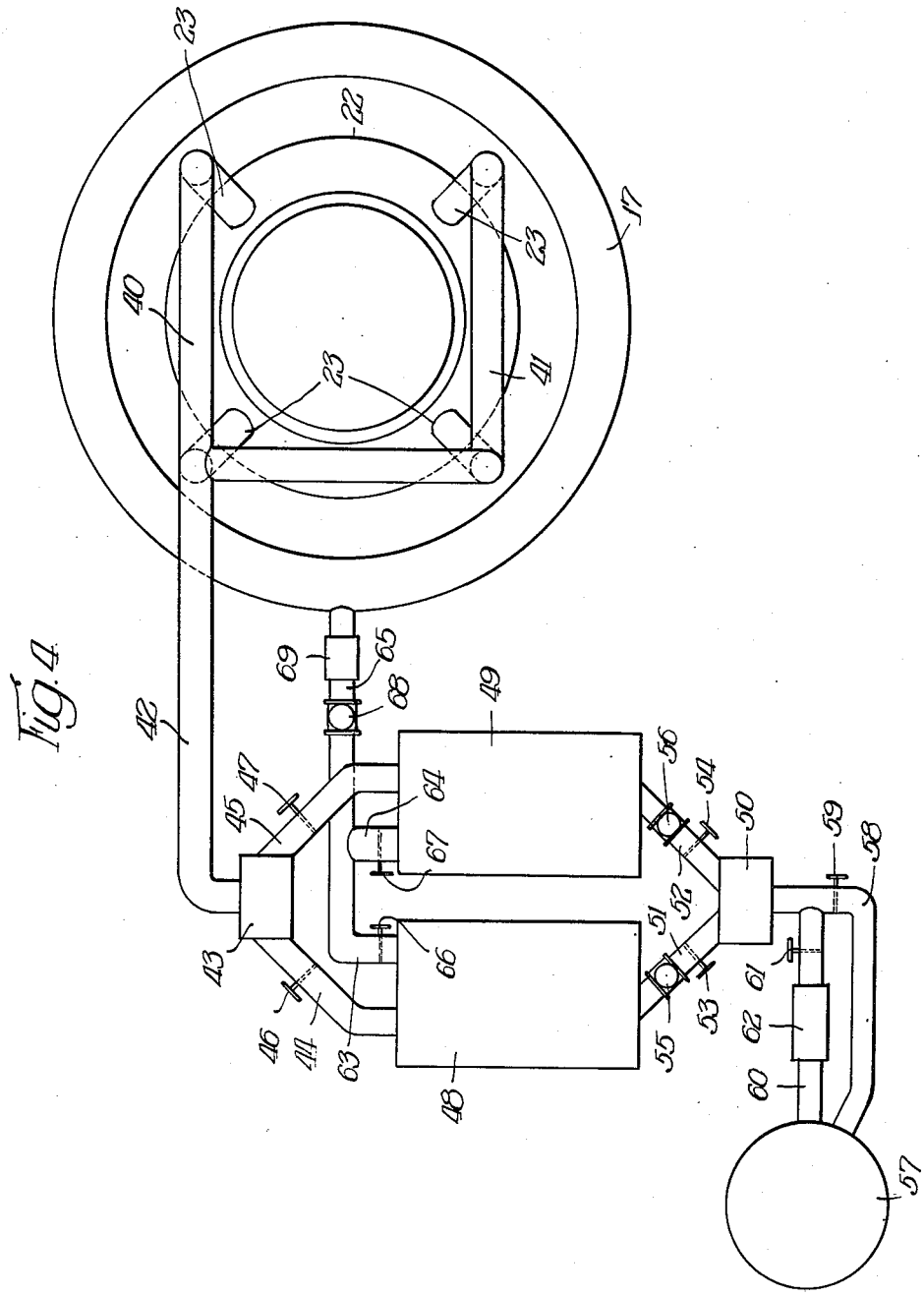

Patented May 19, 1942

2,283,163

UNITED STATES PATENT OFFICE 2,283,163

SHAFT FURNACE AND METHOD OF OPERATING SAME

Herman A. Brassert and Edward L. Ives, New York, N. Y., assignors to H. A. Brassert & Company, New York, N. Y., a corporation of Illinois Application February 7, 1941, Serial No. 377,784

6 Claims. (Cl. 75—43)

This invention relates to a new and improved shaft furnace and method of operating the same, and more particularly to a furnace and method especially adapted for the melting of scrap.

The furnace combines a shaft portion and an enlarged hearth portion, the furnace and method of operation being so coordinated that scrap may be preheated in the shaft portion and melted in the lower hearth portion of the furnace. It is important that the scrap be not melted or even raised to a welding temperature in the shaft portion of the furnace, as partly melted or welded scrap would tend to stick together in the absence of substantial quantities of ore or coke and would plug up the stack.

The improved furnace is in general similar in design to that shown in the prior Brassert Patent No. 1,944,874 of January 30, 1934. The hearth portion of the furnace has a raised platform located centrally under the lower end of the shaft and this platform is surrounded by an annular hearth which receives the molten metal. The lower portion of the shaft in the present construction is preferably somewhat reduced in size so that the shaft walls serve to carry part of the weight of the scrap charge.

It is an object of the present invention to provide a new and improved shaft furnace for melting scrap or the like, said furnace including an enlarged lower portion similar to a circular open hearth furnace.

It is also an object to provide a furnace of this character in which the superposed independent shaft portion of the furnace is used to preheat the scrap and to serve as a reservoir of scrap which is continuously available for gravity flow to the melting zone.

It is an additional object to provide a furnace and method of operation in which the temperatures in the shaft of the furnace may be controlled by withdrawing a greater or less portion of the products of combustion in the hearth, directly from the hearth instead of up through the stack.

It is a further object to provide a furnace and method in which the effective heating of the scrap in the stack may be controlled by charging ore, scale or other iron bearing materials into the stack to consume surplus heat.

It is another object to provide a method and furnace by means of which the melting point of the metal in the hearth may be lowered by adding carbon in the form of coke braize or other form into the shaft or by adding iron scrap or pig iron to the charge.

It is an additional object to provide a furnace of this character provided with regenerators and connections for furnishing preheated air to the tuyères, fuel ports or burners.

It is also an object to provide a furnace and method adapted for commercial construction and operation to melt all reasonable sizes of scrap including large lumps, sculls, ingots, blooms or rolls.

Other and further objects will appear as the description proceeds.

We have shown a preferred embodiment of a furnace built according to the present invention, somewhat diagrammatically, in the accompanying drawings, in which—

Figure 1 is a vertical section through the furnace;

Figure 2 is a plan view of the furnace;

Figure 3 is a horizontal section taken through the upper row of tuyères or burners; and Figure 4 is a somewhat diagrammatic plan view showing the furnace and associated regenerators and connections.

The lower or hearth portion 11 of the furnace is provided centrally with a raised hearth platform 12 surrounding the annular basin 13 for holding the bath of molten metal. This is provided with a tap hole 14 and the hearth wall is provided with doors 15 for inspection and for repair of the furnace lining. The doors may also be used for adding constituents to the bath or introducing reagents for treatment of the molten metal.

The hearth portion of the furnace is provided with a plurality of tuyères or burners 16, which may be supplied with heated air under pressure through bustle pipe 17 and feeder pipes 18. The burners or tuyères 16 may be further supplied with fuel through pipes 19. The particular construction of the tuyères or burners forms no part of the present invention. In the normal operation of the furnace according to the present invention for the purpose of melting scrap, the charge in the furnace does not contain fuel sufficient for the melting of the scrap and may contain no fuel at all. Consequently burners or fuel and air ports and not tuyères are normally used, these burners using liquid, gaseous or powdered solid fuel as may be desired, dependent upon the types of burners or ports being used and the relative costs and availability of the different fuels.

The superposed shaft portion 20 of the furnace is located above the center of the hearth. It is provided with a heavy mantle section and a mantle casting 21, frusto-conical in shape with its smaller end above the central hearth platform. This casting is water cooled so as to avoid any possibility of scrap ever becoming welded to it in the operation of the furnace. The upper portion of the shaft is belled out at 22 to provide for the introduction of the charge and for drawing off part or all of the products of combustion through gas offtakes 23.

The upper walls of the hearth portion of the furnace are also provided with gas offtake pipes 24, controlled by valves 25 so that a portion of the products of combustion may be taken off without passing up through the charge in the shaft. These pipes 24 join the upper offtakes 23.

The shaft is closed at its upper end by the cover 26 which is shown somewhat diagrammatically, and is capable of being raised and lowered and moved laterally to clear the furnace top by means of the hoist 27 and carriage 28. The carriage runs on tracks 29 which also support the carriages 30 and 31. The carriage 30 supports the hoist 32 and the magnet 33 which is used to lift large pieces and moved over to deposit them in the furnace. The carriage 31 supports the double hoist 34 which carries the charging bucket 35, the bottom of which is closed by the distributing bell 36. This bucket is used to charge the shaft with small scrap, lime, ore or carbon, such, for example, as coke braize. The bell 36 serves to distribute the small material charged so that it is uniformly placed in the furnace.

As shown diagrammatically in Figure 4, the gas offtake 23 are connected by pipes 40 and 41 which connect to the offtake header leading to slag or dust chamber 43. This chamber 43 is connected by passages 44 and 45 controlled by valves 46 and 47 respectively, the passage leading to regenerators 48 and 49. The opposite ends of the regenerators are connected to chamber 50 by means of passages 51 and 52 controlled by valves 53 and 54. Passage 51 and 52 are also provided with air intake valves 55 and 56 located between the regenerators and the control valves 53 and 54. Chamber 50 is connected to the stack 57 by the passage 58 controlled by valve 59. The by-pass passage 60, controlled by valve 61 and provided with exhaust fan 62, also connects chamber 50 and the stack. The hot air passages 63 and 64 lead from the regenerators 48 and 49 to the hot air header 65, these passages being controlled by valves 66 and 67. The hot air header 65 is connected to the furnace bustle pipe 17. This header 65 is shown as provided with an air intake valve 68 which may be used to temper and modify the temperature of the air supplied to the bustle pipe or which may be used to supply air at atmospheric temperatures if such should be desired for lower furnace heat. The fan or blower 69, located between valve 68 and the bustle pipe 17, serves to draw the air through the regenerators and send it under pressure to the bustle pipe.

The distance between the hearth platform and the mantle is adequate to prevent melting or melting of the charge in the lower portion of the stack. The water cooled mantle casting 21 also insures against metal sticking or welding to the walls. As an example of proper proportions for such a furnace, the distance between the hearth platform and mantle should be approximately half the diameter of the hearth to provide adequate distance between the plane of highest flame temperature and the mantle of the shaft. Two rows of tuyères or burners have been shown but other tuyère arrangements may be used. The burners or tuyères preferably extend in at an angle both in the horizontal plane and in the vertical plane.

Specific figures as to the proportions of a suitable furnace would be a hearth diameter of twenty feet with a hearth platform diameter of eight feet. The tuyères or burners would be directed tangent to a circle approximately six feet in diameter. The bottom of the mantle of the shaft would be ten feet above the hearth platform and would be ten feet in diameter. The shaft would have an interior diameter of twelve feet at its widest point. The conical mantle section serves to carry a portion of the weight of the scrap charge and to direct the charge generally toward the center of the hearth platform.

The use of the regenerators and their associated passages will be readily apparent. The products of combustion may be directed through either regenerator and to the stack. They may be provided with forced draft by fan 62 or merely drawn through by the natural draft of the stack 17. The air to be heated is admitted through either valve 55 or 56, depending on the regenerator used and after heating in the regenerator is carried through header 65 to the bustle pipe 17. The air is normally drawn through the regenerator by the fan 69 which supplies the air under pressure to the furnace ports or burners. It may be diluted or reduced in temperature by air admitted through valve 68. When one regenerator has cooled and the other become heated from the products of combustion, the use of the regenerators is reversed by using the valves shown and described.

While the furnace is primarily designed as a scrap melting furnace, the melting is subject to control and the content of the molten metal may be modified in the process. The melting process is controlled as to the preheat in the shaft by withdrawing variable proportions of gases directly from the hearth. The charge may also have added ore, scale or other iron-bearing materials to consume surplus heat in the shaft. The carbon in the molten metal will preferably be around .5%, but may be varied by additions of carbon to the charge or by adding iron scrap or pig iron to the steel scrap in the charge. The heat in the hearth is varied by control of the burners of tuyères or by the temperature of the air supplied to them, and the molten metal may be more or less refined by the action of the lower series of burners.

While we have described certain preferred embodiments of our improped furnace and melting process, they are capable of modification to meet varying conditions and requirements, and we contemplate such changes as come within the spirit and scope of the appended claims.

What is claimed is:

1. In a melting furnace, a hearth portion, means for causing combustion in the hearth, a raised platform located in the hearth, a shaft portion located above the platform in the hearth, said shaft having gas offtakes connected to its upper end, and gas offtake means independent of the shaft connected to the upper part of the hearth portion of the furnace.

2. In a scrap melting furnace, a circular hearth portion with a raised platform in the center of the hearth, a shaft portion extending upwardly from the center of the hearth roof, the hearth walls having openings therein, burners extending inwardly through said openings, and means independent of the shaft connected to the hearth above the burner openings for leading products of combustion from the hearth.

3. In a scrap melting furnace, a circular hearth portion with a raised platform in the center of the hearth, a shaft portion extending upwardly from the center of the hearth roof, the hearth walls having openings therein, burners extending inwardly through said openings, means connected to the hearth adjacent the shaft above the burner openings for leading products of combustion from the hearth, and means for carrying products of combustion from the upper portion of the shaft.

4. The method of melting metal scrap in a combined hearth and shaft furnace, which comprises charging the scrap into the shaft, supporting the charge partly upon the shaft walls and partly in the hearth, directing melting flame upon the portion of the charge in the hearth, withdrawing controlled portions of the products of combustion directly from the hearth and from the upper portion of the shaft to preheat the metal in the shaft to a point below the welding temperature of the metal, and withdrawing molten metal from the hearth.

5. The method of melting metal scrap in a combined hearth and shaft furnace, which comprises charging the scrap into the shaft together with materials adapted to react with products of combustion to reduce their temperature, directing melting flame upon the portion of the charge within the hearth, separately withdrawing controlled portions of the products of combustion from the hearth and from the upper portion of the shaft to preheat the metal in the shaft to a point below the welding temperature of the metal, and withdrawing molten metal from the hearth.

6. In a scrap melting furnace, a circular hearth portion with a raised platform in the center of the hearth, a shaft portion extending upwardly from the center of the hearth roof, the hearth walls having openings therein, burners extending inwardly through said openings, means connected to the hearth above the burner openings for leading products of combustion directly from the hearth independently of the shaft, means for carrying products of combustion from the upper portion of the shaft, means for conducting heated air to the burners, and heat transfer means for heating said air by heat derived from the products of combustion.

HERMAN A. BRASSERT.
EDWARD L. IVES.